United States Patent [19]

Pavlin et al.

[11] Patent Number: 4,709,084

[45] Date of Patent: Nov. 24, 1987

[54] TERPENE-BASED ESTER TACKIFIERS

[75] Inventors: Mark S. Pavlin, Lawrenceville; Richard L. Veazey, East Windsor Township, Mercer County, both of N.J.

[73] Assignee: Union Camp Corporation, Wayne, N.J.

[21] Appl. No.: 870,893

[22] Filed: Jun. 5, 1986

Related U.S. Application Data

[62] Division of Ser. No. 778,676, Sep. 23, 1985, Pat. No. 4,634,729.

[51] Int. Cl.$^4$ .............................................. C07C 69/74
[52] U.S. Cl. ...................................... 560/118; 560/128
[58] Field of Search ................................ 560/118, 128

[56] References Cited

U.S. PATENT DOCUMENTS

| | | | |
|---|---|---|---|
| 1,993,026 | 3/1935 | Littmann | 560/118 |
| 1,993,032 | 8/1933 | Peterson | 560/118 |
| 2,067,054 | 1/1937 | Humphrey | 560/118 |
| 2,429,858 | 10/1947 | Vincent | 524/285 |
| 2,688,021 | 8/1954 | Jenkins | 560/118 |
| 3,081,334 | 3/1963 | Kauer | 560/118 |
| 3,117,989 | 1/1964 | Sims | 560/118 |
| 3,239,478 | 3/1966 | Harlan Jr. | 525/316 |
| 3,419,598 | 12/1968 | Kauer | 560/118 |
| 3,468,928 | 9/1969 | Gibson | 560/118 |
| 3,468,950 | 9/1969 | Chow et al. | 560/118 |
| 3,929,676 | 12/1975 | Chappell et al. | 560/118 |
| 3,931,077 | 1/1976 | Uchigaki et al. | 524/507 |
| 3,976,606 | 8/1976 | Gobran | 528/205 |
| 4,405,666 | 9/1983 | Squier | 524/377 |
| 4,446,180 | 5/1984 | Schwab | 525/99 |
| 4,490,497 | 12/1984 | Evrard et al. | 525/309 |

OTHER PUBLICATIONS

Kirk-Othmer Encyclopedia of Chemical Technology, vol. 19, p. 834.

*Primary Examiner*—Joseph L. Schofer
*Assistant Examiner*—N. Sarofim
*Attorney, Agent, or Firm*—Kane, Dalsimer, Sullivan, Kurucz, Levy, Eisele and Richard

[57] ABSTRACT

Terpene-based esters are found to be advantageous tackifiers in polymeric resin based adhesives.

8 Claims, No Drawings

TERPENE-BASED ESTER TACKIFIERS

This is a division of application Ser. No. 778,676, filed Sept. 23, 1985, now U.S. Pat. No. 4,634,729, issued Jan. 6, 1987.

BACKGROUND OF THE INVENTION

1. Field of the Invention

The invention relates to terpene-based esters and their use as tackifiers in adhesive compositions and more particularly relates to polymeric resin based adhesive compositions improved by the inclusion of terpene-based esters as tackifier components 2. Brief Description of the Prior Art The prior art is replete with descriptions of elastomeric, polymeric resin based adhesive compositions; see for example the descriptions given in the U.S. Pat. Nos. 3,554,940 and 3,792,002.

Likewise, esters of Diels-Alder adducts of terpenes and polyols are well known compounds. For example, U.S. Pat. No. 2,253,681 discloses esters of conjugated terpene-fumaric acid-alcohol Diels-Alder complexes; U.S. Pat. No. 2,491,409 discloses polymerizable compositions obtained by an esterification reaction of a polyhydric alcohol, a polycarboxylic acid and an adduct formed by a terpene with certain other reactants.

We have found that high molecular weight terpene-based esters are useful as polar tackifiers when incorporated into elastomeric, polymeric rubber resin based pressure sensitive adhesive compositions.

SUMMARY OF THE INVENTION

The invention comprises, in an adhesive composition, which comprises; polymeric resin and a tackifying proportion of a tackifier compound or compounds, the improvement which comprises; the presence of a high molecular weight polar terpene-based ester as a tackifier ingredient.

The invention also comprises the terpene-based esters themselves, found useful as adhesive tackifiers, i.e.; they provide "tack" in adhesive compositions.

The term "terpene" as used herein means a hydrocarbon of the general formulae $C_{10}H_{16}$ or $C_{15}H_{24}$ usually found in association with turpentine, citrus extracts, and many other natural essential oils.

The term "tack" as used throughout the specification and claims means the property of an adhesive to adhere to a surface under light pressure such that an appreciable force is required to effect a clean separation (see Dahlquist, Adhesion Fundamentals and Practice, *Chem. and Ind.*, Chapter 5, 1966, pp. 143–151). Tackifiers are compounds or compositions which when added to the adhesive, enhance tack properties.

DETAILED DESCRIPTION OF THE PREFERRED EMBODIMENTS OF THE INVENTION

The invention is of improved pressure sensitive adhesives of the type based on elastomeric polymeric resins. A wide variety of such resins, both natural and synthetic, and their derivatives are well known as is the method of their preparation. Representative of such resins are natural rubber latex, styrene-butadiene rubber (referred to at times as "SBR"), poly(ethylene-vinyl acetate) (referred to at times as "EVA"), styrene-isoprene-styrene triblock rubber (referred to at times as "SIS"), styrene-butadiene-styrene triblock rubber (referred to as "SBS") carboxylated-SBR, poly(acrylates), and the like. Also, phenol-modified rubbers (phenol or beta-napthol ["Isolac"]); Oxidized rubbers ("Rubbone"); chlorinated rubbers in solution ("Parlon" and "Ty-ply"); rubber hydrochloride ("Pliofilm" and "Marbon" V and X); solutions of chloroprene (neoprene cements); olefin polysulfide cements ("Thiokol") and the like.

Conventional pressure-sensitive adhesives of the type described above generally include as an ingredient, a tackifying proportion of a tackifier. The improved adhesive compositions of the present invention include as such a tackifier ingredient, a high molecular weight terpene-based ester.

The adhesive compositions of the invention are prepared by blending the elastomeric, polymeric resin base with the tackifier terpene-based esters. In preparing adhesive compositions of the present invention, the amounts of tackifier employed are an effective amount to provide tack. This amount, relative to the adhesive base, will vary with the base material. For natural rubber, the ratio of tackifier to adhesive should be approximately 1:1 (on a weight basis), generally in the range of from 5 to 70% tackifier, based upon the total composition weight; for styrene-butadiene rubber, the ratio of tackifier to rubber should be approximately 2:3, generally from about 15 to 60% tackifier, based upon the total composition weight; and for hot-melt adhesives the ratio of tackifier to base should be approximately 1:1, generally from about 15 to 70% tackifier, based upon the total weight of the composition. The overall adhesive formula which comprises a composition of the invention may contain other materials which are normally placed in an adhesive. For example, other tackifiers, such as the glycerol ester of hydrogenated rosin, sold commercially as Foral 85 or Staybelite Ester 10, the pentaerythritol ester of hydrogenated rosin sold commercially as Foral 105, the pentaerythritol ester of hydrogenated rosin sold commercially as Pentalyn H, the glycerol ester of polymerized rosin sold commercially as Polypale Ester 10, the pentaerythritol ester of polymerized rosin sold commercially as Pentalyn C, rosin-derived dimeric acids sold commercially as Dymerex Resin, the polymerized-C-5 petrochemical olefins sold commercially as Wingtack 10, Wingtack 95, Escorez 1310 and Escorez 5380, the polymerized beta-pinene resins sold commercially as Piccolyte S-resins, Croturez B-resins, Zonarez B-resins, and Nirez T-4115, the polymerized-alpha-pinene resins sold commercially as the Piccolyte A-resin series, the polymerized-limonene resins sold commercially as Piccolyte C-resin series and the polymerized-dipentene resins sold commercially as the Piccolyte D-resin series. If desired, a plasticizer may be incorporated in small amounts into the base material for the adhesive. Similarly, fillers, reinforcing agents, antioxidants, vulcanizers, extenders, softeners, processing aids, activators and accelerators, all as well known in the preparation of natural and synthetic rubber adhesive compositions, may be used in the compositions of the present invention employing the novel tackifier. Similarly, pigments, such as ultramarine, vermillion, or the like, can be employed to impart a desired color to the overall composition of the invention.

The tackifiers used in the present invention may also be used to tackify pressure-sensitive adhesives not only of the natural rubber and styrene-butadiene rubber types, but also may be employed in tackifying hot-melt adhesives. The major components of such hot-melt adhesives are generally wax and ethylene/vinyl acetate copolymers. The general formulations of these hot-melt adhesives, except for the tackifier, are those generally employed in the art, such as are illustrated for example in U.S. Pat. No. 3,239,478. The portion of this latter patent which is pertinent to the present disclosure is herein incorporated by reference.

The terpene-based esters used as tackifiers in the composition of the invention may be prepared by first forming the Diels-Alder adduct of a terpene diene or triene with acrylic acid, methacrylic acid, or other alpha-beta unsaturated acid and then reacting this adduct with a polyhydric alcohol. They may be prepared by the Diels-Alder reaction of a terpene diene or triene and a pre-formed acrylate-polyol ester. The reaction which occurs in the latter case may be illustrated by the schematic formulae:

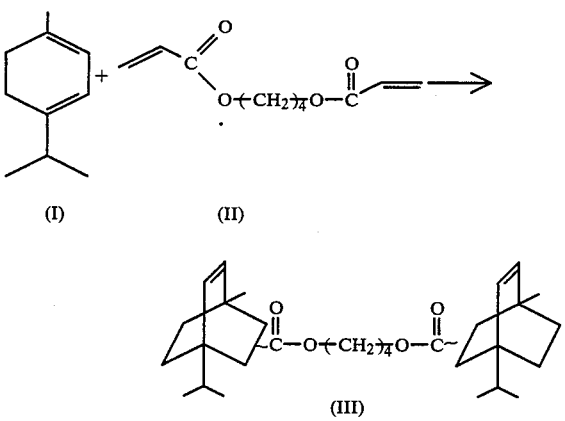

wherein (I) is alpha-terpinene, (II) is butanediol diacrylate and (III) is the ester diadduct and wherein the wavy line represents attachment at the 5 (and 5′) or 6 (and 6′) positions of the bicyclo[2.2.2]octene moiety. The reaction proceeds by the Diels-Alder reaction of stoichiometric proportions of the terpene and the acrylate-polyol ester. The Diels-Alder reaction is a well known synthesis, details of which are given in *Ber.* 62, 2081-2087 (1929).

In general, the reaction is carried out for about 1 to 36 hours at a temperature of from about 40° C. to 250° C., preferably 100° C. to 170° C. But temperature conditions can be varied so as to obtain tackifiers with particular desirable characteristics. For example, heating at a low temperature, for example circa 80° C., for 24 hours, preserves acrylate groups, which are useful as "cross-linkable" groups with particular block elastomer base adhesive resins. The Diels-Alder reaction proceeds well under sub-atmospheric, superatmospheric or ambient atmospheric pressures.

Upon completion of the reaction described above, the desired terpene-based esters may be separated from the reaction mixture by conventional techniques such as, for example, by extraction in solvent, washing and stripping of solvent. Generally the crude reaction mixture contains substantial proportions of excess reactant and co-products. According to a preferred embodiment of the invention, the excess reactants and co- or by-products may be allowed to remain in admixture with the desired terpene-based esters, for use as tackifiers as hereinafter described. Relatively pure terpene-based esters of the invention are not required for use as tackifiers.

Representative of the terpene-based esters of the invention which are useful as adhesive composition tackifiers are those of the formula:

$$(R)_n AP \qquad (IV)$$

wherein R is the residue of a conjugated terpene diene or triene compound following Diels-Alder reaction with an acrylate-polyol ester, AP representing the reaction residue of the acrylate-polyol ester and n being a whole number integer equal to the number of reacted acrylate groups on the acrylate-polyol ester respectively.

Advantageously, the terpene-based esters of the formula (IV) given above will have a molecular weight of more than about 300 up to about 1000; preferably greater than 400 and most preferably greater than 500.

The conjugated diene terpene compounds employed to obtain the terpene-based esters may be unsaturated monocyclic terpene compounds such as, for example alpha-terpinene, alpha-phellandrene, alpha-pyronene, beta-pyronene, 3,8-p-menthadiene, 1,3,8-p-menthatriene, and the like or mixtures thereof; or it may be an unsaturated acyclic triene, for example allo-ocimene, ocimene, myrcene and the like or mixtures thereof. These terpene compounds need not be in the form of pure compounds, but may be used in crude form. Thus, in place of the several pure terpene compounds, crude natural mixtures of terpene compounds as, for example, acid-isomerized turpentine, alpha-pinene pyrolyzate, pine oil, etc., or mixtures of terpenes with petroleum or other saturated hydrocarbons may be used. Various fractions from these mixtures may also be used without the necessity of isolating the terpene compounds in their pure state.

The acrylate-polyol ester such as the butanediol diacrylate compound (II) shown above is the reaction product of a polyhydric alcohol and an unsaturated compound of the formula:

$$\begin{array}{ccc} R_3 & R_1 & O \\ | & | & \| \\ HC=C-C-O-R_2 \end{array} \qquad (V)$$

wherein $R_1$ is selected from hydrogen and methyl; $R_2$ is selected from hydrogen, methyl and ethyl; and $R_3$ is selected from hydrogen and methyl. Thus the term "acrylate-polyol esters" is used herein to mean those esters obtained upon reaction of an equivalent excess of acrylic acid, methacrylic acid or crotonic acid with a particular class of polyol.

The term "equivalent excess" is used herein to mean an excess proportion, on an equivalent basis, over that theoretically required to react with all of the hydroxyl groups present in the polyol. Preferably at least a 10 percent equivalent excess of the acrylic acid (V) is employed.

The preparation of the acrylate-polyol ester is carried out by heating the polyol with the acrylic acid (V), usually in the presence of a catalytic amount of a strong acid catalyst, such as sulfuric, p-toluenesulfonic, or methanesulfonic acids. A catalytic amount is generally in the range of about 0.01% to 5.0% by weight based on the weight of the reactants, but in some cases the strong acid may be omitted.

Preferably the acrylate-polyol ester is formed under a non-oxidizing atmosphere. This may be accomplished by conventional techniques such as by employing apparatus and methods for reaction under an inert gas atmosphere such as nitrogen gas. The reaction is generally carried out at a temperature between 80° and 130° C., at the boiling point of the reaction mixture. Since an organic co-solvent such as benzene, toluene, xylene, ethylenedichloride, cyclohexane, heptane, etc., is desirably added in order to remove the water of esterification by azeotropic distillation, the boiling point of the reaction mixture depends on the selection of which solvent is employed. In preparing the acrylate-polyol ester, a polymerization inhibitor may be added to the reaction mixture to keep it from gelling. Examples of polymerization inhibitors are hydroquinone, 4-tert-butylcatechol, 2,6-tertbutyl-p-cresol, and the like. It is also desirable that the acrylic acid be added to the reaction mixture slowly over a period of time rather than all at once in the beginning, to prevent unwanted polymerization. The proportion of polymerization inhibitor used is generally within the range of from 0.1 to 2.0 percent by weight of the polyol.

It is also possible, to prepare the acrylate-polyol esters by a transesterification procedure. Here methyl or ethyl acrylate is used in excess both as a reactant and to dissolve the polyol. A catalyst such as sodium methoxide in an amount of from 0.01 to 1.0% by weight of the reactants may be used advantageously to promote the transesterification. The by-product methanol or ethanol is removed by absorption into molecular sieves which are added to the reaction mixture. The reaction is generally rapid enough under these conditions so that it may be carried out at room temperature (about 25° C.).

Time required for completion of the reaction forming the acrylate-polyol ester compositions will vary depending upon the reactants and the temperatures employed. Completion of the reaction may be determined by monitoring the reaction mixture with infrared analysis to observe the disappearance of the hydroxy absorption for the polyol reactant. Upon completion of the reaction, the desired acrylate-polyol ester compositions are conveniently separated from the reaction mixture by conventional methods such as, for example, by extraction in solvent, washing, stripping of solvent by distillation and like techniques.

The polyol reactant employed to prepare the acrylatepolyol esters may be a polyhydric alcohol having from 2 to 9 hydroxyl groups. Representative polyhydric alcohols are, for example, ethylene glycol, 1,3-propanediol, 1,4-butanediol, 1,5-pentanediol, 1,6-hexanediol, a polyglycol as diethylene glycol, triethylene glycol, dipropylene glycol, dibutylene glycol, trimethylene glycol; isobutylene-ethylene glycol, trimethylene glycol; the monoethyl, monopropyl or monobutyl ethers of glycerol; dicyclopentadienyl dimethanol, pentaerythritol, dipentaerythritol, tripentaerythritol, trimethylolpropane, trimethylolethane, etc., glycerol, glycerol monoacetate, mannitol, sorbitol, xylose, and the like, or mixtures thereof. Preferably, the polyols employed to prepare the acrylate-polyol esters are aliphatic polyols having a molecular weight of from about 60 to about 260.

The following preparations and examples describe the manner and process of making and using the invention and set forth the best mode contemplated by the inventors but are not to be construed as limiting. All parts are by weight unless otherwise indicated.

Where test results are given, the following tests were employed:

(1) Tackiness (Rolling Ball Method)

The surface of a glass plate, 102 mm.×300 mm., was coated with the adhesive in 2 mil thickness and dried at room temperature for 24 hours in an air-conditioned room.

The resultant plate coated with the adhesive was subjected to the tackiness testing method described in "Test Methods for Pressure-Sensitive Tapes" (published by the Specification and Technical Committee of The Pressure Sensitive Tape Council, 7th Ed., 1976, pp. 28–29), in which a steel ball 0.438 cm in diameter is allowed to roll down by gravity from a point 15.5 cm from the bottom of the slope at 30° onto a coated glass plate. The distance the ball rolls is inversely proportional to the tackiness of the adhesive coat.

(2) Tackiness (Finger Tack Method)

The resultant plate coated with the adhesive as described in (1) above was tested for finger tack as described below. The right index finger was moved toward the plate at approximately 1 cm/sec. until contact with the adhesive was made. A light force was applied for 1 second after which time the finger was removed from the adhesive at a speed of approximately 1 cm/sec. The resistance to separation was subjectively classified as none, slight, good or excellent.

(3) Tackiness (Polyken Probe Method)

The surface of a 102 mm×300 mm sheet of irradiated polypropylene 2 mils in thickness was coated with a 20% by weight of a toluene solution of the adhesive such that before drying a 2 mil film was cast. The adhesive was allowed to dry for 24 hours at room temperature (22°–25° C.) in an airconditioned room.

The resultant coated polypropylene was subjected to the testing method described in an article by Fred H. Hammond, Jr., "A Probe Tack Tester", in *Modern Packaging*, April, 1964. In this method a 1 cm$^2$ stainless steel probe is allowed to contact the adhesive at the force of 100 g/cm and the maximum force in grams required to separate the probe from the adhesive is measured. Tackiness measurements were made at probe speeds of 0.1 and 1.0 cm/sec. and at 1 and 10 seconds dwell time. Six measurements were made at each probe speed and dwell time setting and the mean value was calculated.

Probe speed or dwell time effects were calculated by subtracting the slower speed (or dwell time) mean tack value from the higher speed (or dwell time) value and dividing the result by 2.

(4) Peel Strength

The adhesive coated polypropylene sheets as described above were cut into 1 inch-wide strips and their peel force to stainless steel was determined as described in "Test Methods for Pressure Sensitive Tapes", 7th Ed., 1976, p. 22.

(5) Shear Adhesion (Holding Power)

The adhesive coated polypropylene sheets as described above were cut into 1 inch wide strips and the hold times to failure were determined as described in "Test Methods for Pressure Sensitive Tapes", 7th Ed., 1976, p. 30.

(6) Tg (by Differential Scanning Calorimetry)

A DuPont 910 Differential Scanning Calorimeter (DSC) with a DuPont 990 Thermal Analyzer Controller was used to determine the Tg values (glass transition temperature) of the tackifiers. The Tg was designated to be the temperature of the inflection point on a heating curve when the heating rate was 10° C./min.

EXAMPLE 1

The following were mixed together: xylene (6 g), alpha-terpinene (Fluka, 0.6 moles, 79.5 g), and butanediol diacrylate (0.25 moles, 49.5 g). This formed a homogeneous solution. With stirring, this material was heated to 155° C. for 3 hours and then to 160° C. for an additional 3.5 hours. The mixture was put under aspirator vacuum and 17.1 g of hydrocarbon were removed at 115° C. The product was a pale yellow oil (crude weight of 110.5 g). The product had a Tg of −58° C.

EXAMPLE 2

A round bottom flask was charged with 100 g myrcene and heated to 140° C. under a blanket of nitrogen gas. 100 g of myrcene and 70 g of trimethylol propane triacrylate was then added over a one hour period. The acrylate charge was 0.236 moles and the myrcene 1.47 moles, giving a 108% molar excess of myrcene. After completion of addition, the temperature was raised to 150° C. and held there for two hours. The reaction mass was then cooled to room temperature and the pressure reduced to 50 mmHg. Myrcene was removed, and then a full vacuum put on the mixture and the pot contents were taken up to 200° C. and held there for half an hour. The product weight upon cooling at room temperature was 203.9 g.

EXAMPLE 3

A 250 ml round bottom flask was charged with 41.1 g of trimethylolpropane triacrylate (0.14 moles) and 58.4 g of alpha-terpinene which had been passed through alumina. This mixture was heated to 120° C. at which time an additional 36.6 g of alumina-treated alpha-terpinene was added (total amount 95.0 g, 0.698 moles). Heating was continued at 120° C. for 2 hours, then the temperature was raised to reflux for one hour (180° C.). Excess alpha-terpinene (55.1 g) was then distilled at atmospheric pressure (55.1 g) to a pot temperature of 240° C. Vacuum was then put on the mixture and more hydrocarbon was taken off until the pot reached a temperature of 200° C. at full pump vacuum. This distillation gave a total of 40.6 g of hydrocarbon removed. The product was a clear, water-white oil, 86.9 g and had a Tg value of −2.5° C.

EXAMPLE 4

Alloocimene was passed through activated alumina and then 73.5 g (0.51 moles) was charged to a 250 ml round bottom flask under nitrogen gas (0.51 moles) along with 39.4 g (0.133 moles) trimethylolpropane triacrylate. This reaction mixture was stirred and heated to 160°–165° C. and held at that temperature for 2 hours. Unreacted terpenes (22.7 g) were then removed under full vacuum at a temperature of 170° C. The product weighed 88.6 g and had a Tg of 4° C.

EXAMPLE 5

A 500 ml round bottom flask was charged with alloocimene 95 (alumina-treated, 108.2 g, 0.75 moles), pentaerythritol tetraacrylate (50.5 g, 0.14 moles), and cyclohexane (30 g). This mixture was heated to gentle reflux (approximately 100° C.) and was held there overnight. The next day heating was continued and material distilled until the pot temperature reached 140° C. At that point all the cyclohexane was distilled and the pot temperature was raised to 180° C. for 5 hours. The temperature was then raised to 250° C. with distillation of 25.7 g of hydrocarbon. The product oil (97 g) was charged to a Kugelrohr flask and 11.2 g of material was removed at about 1 mmHg, at a temperature of 192° C. The product is a cloudy, viscous, sticky liquid at 100° C. It was poured onto a sheet of aluminum foil and allowed to cool thoroughly. The product was a white powder with a Tg of 25° C.

EXAMPLE 6

A reaction flask was charged with technical allo-ocimene (279.2 g, about 40% purity), a small mount of polymerization inhibitor, and acrylic acid (86.1 g). This mixture was heated to 170° C. over 80 minutes, then held at 170°–175° C. for 2 additional hours. Unreacted hydrocarbons (103.4 g) were then removed by distillation under vacuum and the crude product flashed under high vacuum to give a heart cut of 157.7 g of a clear, viscous, colorless oil. To this material was added trimethylolpropane (33.8 g), solvent p-cymene (63 g), and catalyst p-toluenesulfonic acid (2 g). This mixture was heated with stirring for 5 hours to up to 175° C. with water removal. The product was cooled, washed with dilute caustic solution, and stripped of solvent and then unreacted adductacid at high vacuum to give 199.7 g of product which analyzed by LC to be almost entirely a single component. This product had a Tg of 35° C.

EXAMPLE 7

(A). The Diels-Alder Adduct of Alpha-Terpinene and Acrylic Acid.

A flask was charged with alumina-treated alpha-terpinene (90.2 g, 0.662 moles), 2 milligrams of Ionol, and acrylic acid (Aldrich, 54.9 g, 0.76 moles). This mixture was homogeneous. The mixture was warmed to 145° C. (reflux) and held there for 7 hours.

At the end of this time the pot temperature was 170° C. The product was a thick, clear oil with a small amount of white solid. The system was cooled, then put under full vacuum. The pot temperature was taken to 140° C. and was held there one-half hour. During this time 15.7 g of light ends were removed. The final product weight was 127.0 g.

(B). Ester Formation with Cyclohexane Dimethanol.

A 250 ml flask was charged with 1,4-cyclohexanedimethanol (19.1 g, 0.13 moles), toluenesulfonic acid (0.6 g), monoacid adduct from Part IA) above (55.2 g, 0.27 moles) and 100 ml mixed xylenes as solvent. This mixture was heated to reflux and water was removed in a Dean-Stark apparatus. After 3 hours, 3.5 ml of water were taken off. Heating was continued for 3 more hours. LC analysis suggested the product was about 75% of a single compound.

EXAMPLE 8

Pressure sensitive adhesives (PSAs) were prepared by mixing a 20 weight percent toluene solution of the tackifier prepared in accordance with the Example 6, supra., with a 20 weight percent solution of a ethylene-vinyl acetate copolymer (Vynathene EY-903 sold commercially by U.S.I. Incorp.), in the proportions of 50 weight percent of Example 6 tackifier to 50 weight percent Vynathene EY-903, casting a 13 mil wet film on irradiated polypropylene and allowing the film to dry 24 hours. The dried film was tested for its tack. The test result were given in Table 1 below.

EXAMPLE 9

Following the procedure of Example 8, supra., but employing SBR (styrene-butadiene rubber) as the adhesive base resin and wherein the weight percentage was 40 weight precent tackifier to 60 weight percent SBR, a pressure sensitive adhesive was prepared. The test results are given in Table 1, below.

EXAMPLE 10

Repeating the procedure of Example 8, supra., but employing as the adhesive base resin an equal proportion of Stereon 840A (a styrene-butadiene block copolymer rubber sold commercially by Firestone), a pressure sensitive adhesive was obtained. The test results are given in Table 1, below.

The procedure of Examples 8 and 9, supra., were repeated except that the novel tackifier as used therein was replaced with equal proportions of a hydrocarbon tackifier Wingtack 10 sold commercially by Goodyear as a comparative control. The results are shown in Table 1, below for comparison.

EXAMPLES 11–14

Pressure sensitive adhesives (PSAs) were prepared using SIS, poly(styrene-isoprene-styreme) triblock copolymer elastomer (sold commercially by the Shell Chemical Company as Kraton ® 1107), and using SEBS, poly(styrene-ethylene-butylene-styrene) triblock copolymer elastomer (sold commerially by the Shell Chemical Company as Kraton ® GX-1657) with terpene-based esters as described in Examples 8–10, supra., empolying various tackifiers as prepared in Examples 3 and 4, supra. The test results are shown in Table 2, below.

TABLE 2

PROBE SPEED AND DWELL TIME EFFECTS FOR THE TERPENE-BASED ESTERS IN SIS AND SEBS

| Rubber | Terpene-Based Ester[a] | Mean (Grams) | Polyken Probe Tack[b] Probe Speed Effect (% of Mean) | Dwell Time Effect (% of Mean) | Hold Time (Hours) |
|---|---|---|---|---|---|
| SIS | Example 3 | | | | |
| Ex. 11 | (50/50) | 395 | −91 | +25 | 1.8 |
|  | (40/60) | 564 | −41 | +14 | .67 |
|  | Example 4 | | | | |
| Ex. 12 | (50/50) | 742 | +17 | +19 | 1.5 |
|  | (40/60) | 964 | +6 | +8 | .03 |
| SEBS | Example 3 | | | | |
| Ex. 13 | (50/50) | 131 | −129 | +56 | — |
|  | (40/60) | 321 | −66 | +81 | — |
|  | Example 4 | | | | |
| Ex. 14 | (50/50) | 169 | −66 | +81 | — |
|  | (40/60) | 214 | −105 | +76 | — |

[a] Rubber to tackifier ratio bracketed.
[b] See footnotes Table 1.

What is claimed:

1. Terpene-based esters of formula:

$$(R)_n AP$$

wherein R is the residue of a conjugated diene terpene compound following Diels-Alder reaction with a acrylate-polyol ester; AP represents the reaction residue of the acrylatepolyol ester; and n is a whole number integer equal to the number of reacted acrylate groups on the acrylate-polyol ester.

2. Terpene-based esters of formula:

$$(R)_n AP$$

TABLE 1

COMPARATIVE TACK PERFORMANCE OF EXAMPLE 6 ESTER PRODUCTS IN ELASTOMERS WITH THAT OF Wingtack 10

| Elastomer | Elastomer to Tackifier Weight Ratio | Mean Value (Grams)[a] | Polyken Probe Tack Probe Speed Effect (% of means)[b] | Dwell Time Effect (% of means)[c] | Hold Time (Hours) |
|---|---|---|---|---|---|
| SBR (Example 9) | 60/40 | 654 | 0 | +17 | 9 |
|  | 60/40 (Wingtack 10) | 290 | +16 | +9 | 5 |
| Stereon 840 A (Example 10) | 50/50 | 1003 | +16 | +20 | 7.4 |
| Vynathene EY-903 (Example 8) | 50/50 | 752 | +8 | +23 | 31 |
|  | 50/50 (Wingtack 10) | 174 | +81 | +39 | .2 |

[a] Mean of tack values obtained at 1 and 0.1 cm/min. probe speeds and 1 and 10 seconds dwell times.
[b] The probe speed effect equals the sum of the tack values at 1 cm/second minus the sum of the tack values at 0.1 cm/second divided by 2.
[c] The dwell time effect is calculated similarly to that of the probe speed effect.

wherein R is the residue of a conjugated triene terpene compound following Diels-Alder reaction with a acrylate-polyol ester; AP represents the reaction residue of the acrylatepolyol ester; and n is a whole number integer equal to the number of reacted acrylate groups on the acrylate-polyol ester.

3. Terpene-based esters of the formula:

$$(RA)_nP$$

wherein RA is the residue of the Diels-Alder adduct of a terpene diene compound and acrylic acid, methacrylic acid, or crotonic acid following esterification with a polyol; P represents the esterification reaction residue of the polyol; and n is a whole number integer equal to the number of reacted alcohol groups in the polyol.

4. Terpene-based esters of the formula:

$$(RA)_nP$$

wherein RA is the residue of the Diels-Alder adduct of a terpene triene compound and acrylic acid, methacrylic acid, or crotonic acid following esterification with a polyol; P represents the esterification reaction residue of the polyol; and n is a whole number integer equal to the number of reacted alcohol groups in the polyol.

5. The esters of claim 1 and 3 which are prepared from alpha-terpinene, acrylic acid, and trimethylolpropane.

6. The esters of claim 1 or 3 which are prepared from alpha-terpinene, acrylic acid, and pentaerythritol.

7. The esters of claim 2 or 4 which are prepared from allo-ocimene, acrylic acid, and trimethylolpropane.

8. The esters of claim 2 or 4 which are prepared from myrcene, acrylic acid, and trimethylolpropane.

* * * * *